June 6, 1939.  W. CRITCHLOW  2,160,958
TABLE ATTACHMENT FOR AUTOMOBILES
Filed Nov. 20, 1937
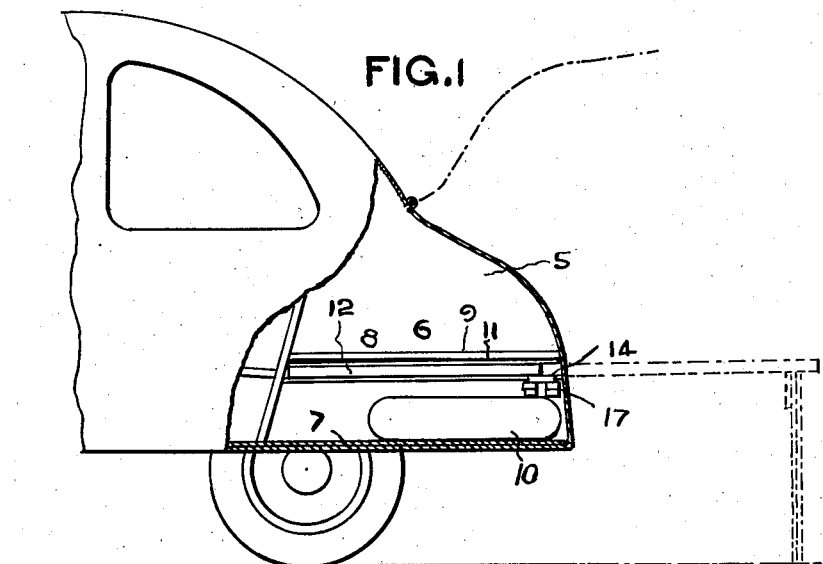
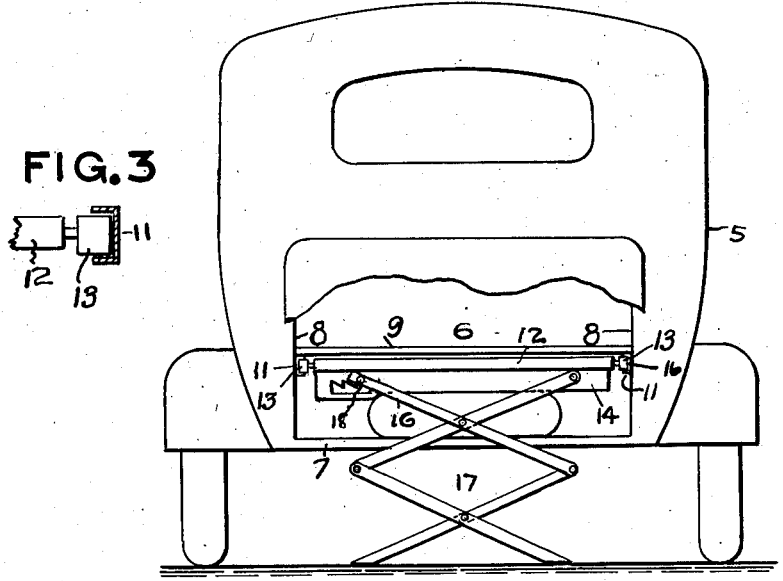
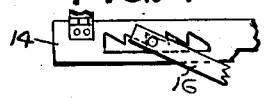
INVENTOR.
William Critchlow
BY Richard S. Harrison
ATTORNEY Patented June 6, 1939

2,160,958

UNITED STATES PATENT OFFICE 2,160,958

TABLE ATTACHMENT FOR AUTOMOBILES

William Critchlow, New Castle, Pa.

Application November 20, 1937, Serial No. 175,660

1 Claim. (Cl. 311—21)

My invention relates to attachments for automobiles, relating in particular to autos of the sedan and coach type, wherein the rear portion thereof has a receptacle or compartment for transporting luggage, goods, etc.

The object of my invention is to provide an extension table attachment upon which to partake of lunch, card playing, displaying of goods, etc., and which may also be readily folded into the car in an out-of-the-way place.

With the above and other objects in view, the invention consists in certain novel features and details of construction and arrangement of parts to be hereinafter more specifically described, illustrated in the accompanying drawing and particularly pointed out in the appended claim.

In the drawing:

Figure 1 is a side elevation, partly broken away, of the rear portion of the type of automobile to which my invention applies, showing my attachment thereto.

Figure 2 is a rear view of the same machine further showing my improvement applied thereto.

Figure 3 is a fragmentary part of the improvement, and

Figure 4 is also a fragmentary part of my improvement.

Referring to the drawing in detail, where like numerals of reference denote corresponding parts, the reference character 5 denotes the rear part of a sedan or coach body, having therein the compartment 6, the base of which is formed by the floor 7, the side walls 8 by 8, and the fixed cover 9, said compartment being open at the rear and is intended to confine a spare tire 10 where it is out of the way and protected from inclement weather conditions, mud, etc.

Between the upper side of the tire and the cover 9, is a space which I propose utilizing as a storage place for the table when not in service.

The table top 12 is provided with edge rollers 13 suitably spaced apart, which operate in runways 20 suitably attached to fixed supporting means.

To the table top is hingedly attached a cross strip 14 having teeth 15 at one end.

To the opposite end of the said strip is pivotally attached the one leg 16 of a lazy-tong support 17 the other leg thereof being free and adapted to engage one of the teeth 15 in practice by the pin 18 carried thereby.

To use the table, the same is pulled out rearwardly a suitable distance, or to a stop, not shown. The legs of the lazy-tong are then released, falling downward in operative position. Then by adjusting the pin 18 into engagement with the proper tooth, the table is made level and ready for service.

To return to its former position within the car, the tongs are folded up against the underside of the table top, as shown in Figure 1, and pushed back into place.

As will be apparent, the invention is susceptible to various changes in its form, proportion and minor details of construction, and the right is herein reserved to make such changes as properly fall within the scope of the appended claim.

Having thus shown and described my invention, what I claim and desire to secure by Letters Patent is—

The combination with the body of an automobile, of a pair of oppositely disposed and fixed channel members therein, a table top having rollers at its opposite edges for engaging in the channels and supporting the top, a cross member hingedly attached to the outer end of the top and provided with ratchet teeth, and a supporting member in the form of a lazy tong pivotally secured at one of its legs to the cross piece, the other leg adapted at its free end to engage said teeth to lock the lazy tong in place and to support said top when extended for use, said supporting and cross member being foldable beneath the top when not in use.

WILLIAM CRITCHLOW.